Patented May 26, 1942

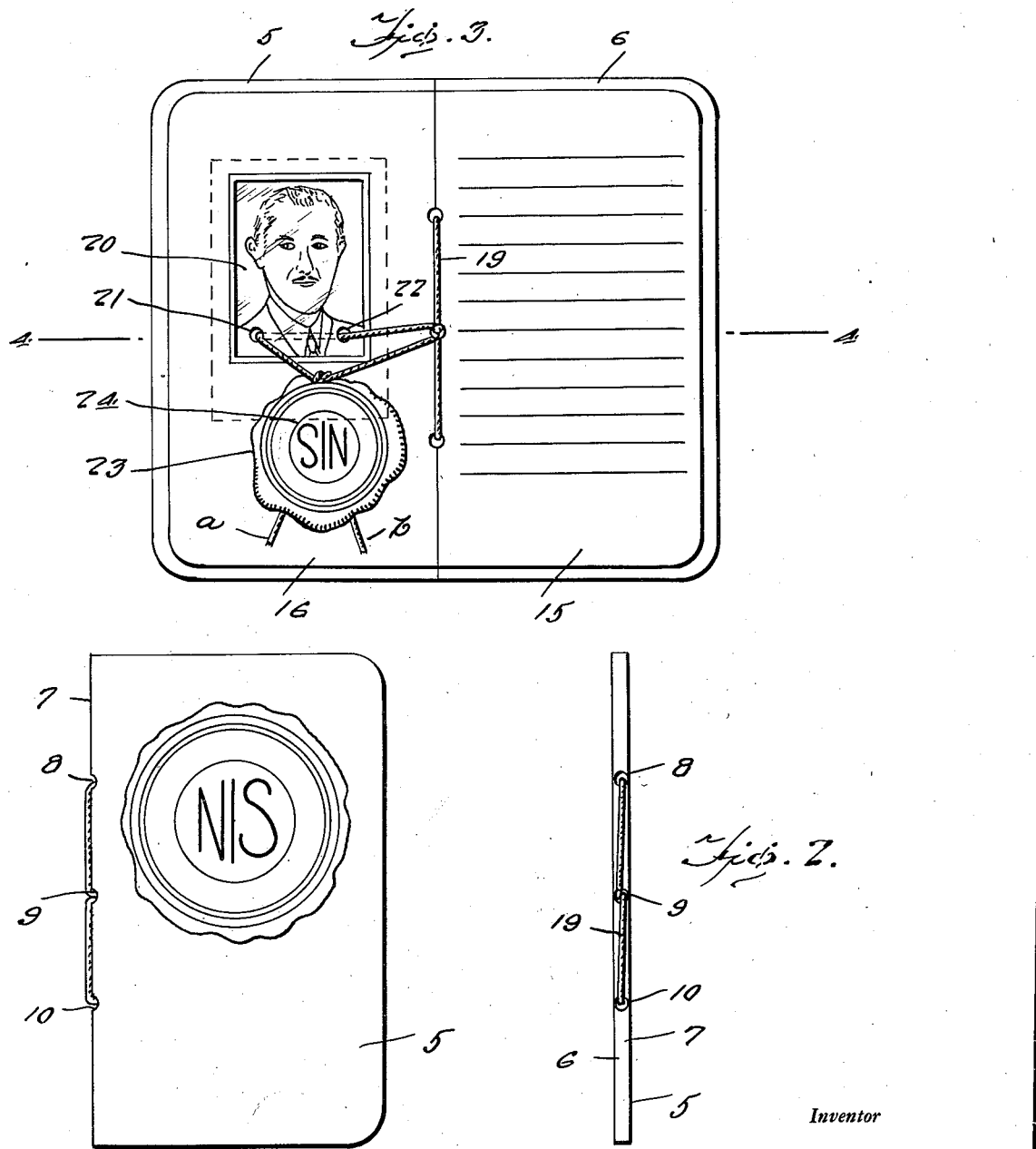

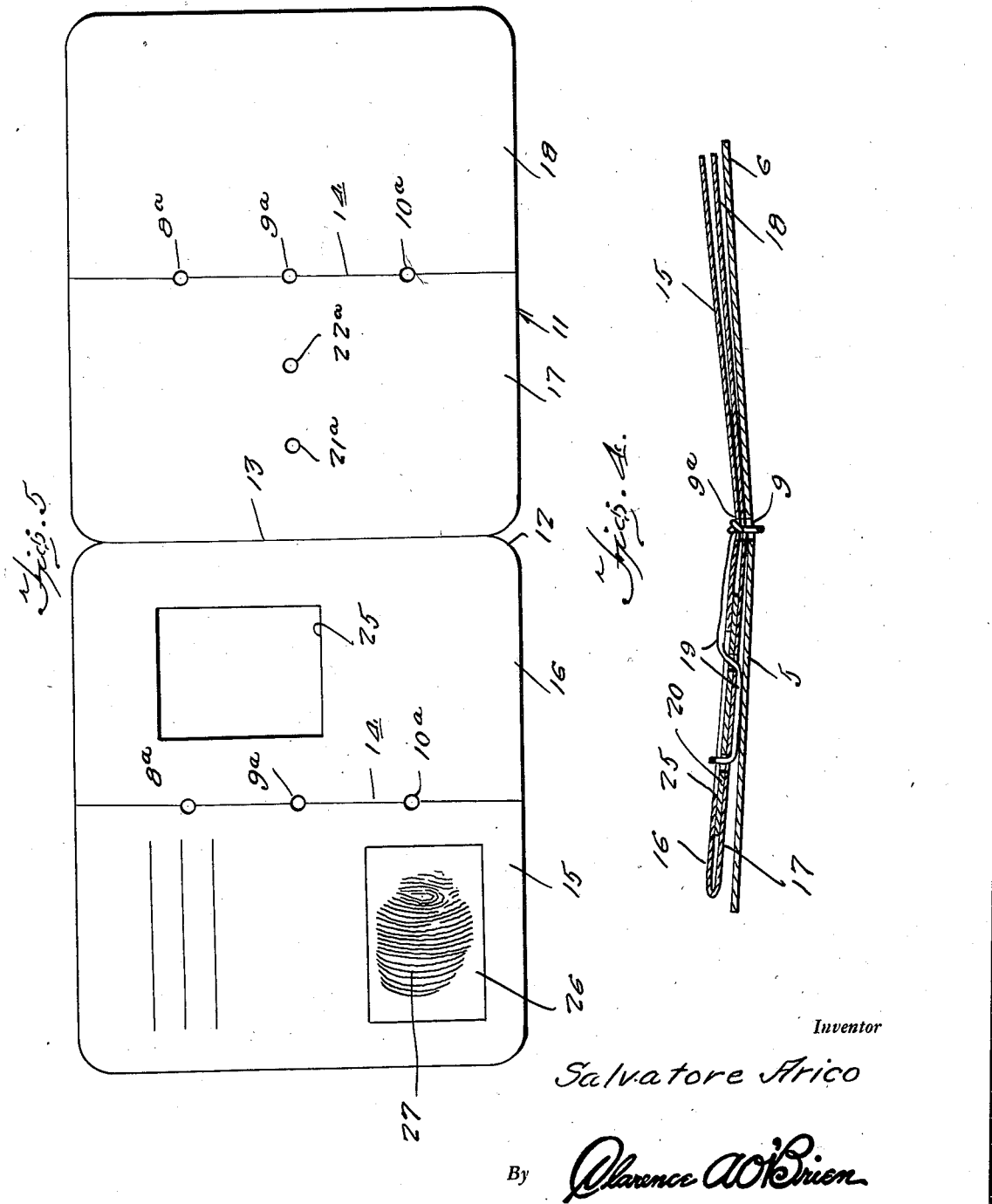

2,283,898

UNITED STATES PATENT OFFICE 2,283,898

IDENTIFICATION DEVICE

Salvatore Arico, New Orleans, La.

Application May 14, 1941, Serial No. 393,440

1 Claim. (Cl. 283—7)

This invention relates to new and useful improvements in personal identification devices and more particularly to a personally carried identification device which can be issued by a national organization and the data on which will be kept in duplicate by the headquarters of said national organization.

Another important object of the invention is to provide identification device wherein the items of identification are ribboned or corded and sealed in a manner that will prohibit alteration without observable mutilation.

Other objects and advantages of the invention will become apparent to the reader of the following specification.

In the drawings:

Figure 1 represents a front elevational view of the identification device.

Figure 2 is a back edge elevational view.

Figure 3 is a plan view looking at the identification device in open position.

Figure 4 is a section on the line 4—4 of Figure 3.

Figure 5 is a plan view of the pattern of the sheet assembly.

Referring to the drawings, wherein like numerals designate like parts, it can be seen that the identification device consists of a back structure made up of the swingable section 5—6 swingable from a folded portion 7 in which three openings 8, 9 and 10 are located.

A peculiarly constructed sheet assembly is provided for the booklet and this consists of an elongated sheet generally referred to by numeral 11 which is notched inwardly at its side edge portions as at 12, 12. A fold line 13 is made between the notched portions 12, 12. This divides the sheet into a pair of areas each of which has a transverse fold line 14 along which are openings 8a, 9a and 10a. These fold lines 14 divide the aforesaid areas into page sections 15, 16, 17 and 18.

It can now be seen that the area consisting of the sections 15 and 16 are disposed over the sections 17 and 18 and a cord or ribbon 19 is trained through the openings 8, 9 and 10 of the back structure and also through the openings 8a 9a and 10a. A photograph 20 is now slipped between the page sections 16 and 17 after it has been formed with openings 21 and 22 and the cord or ribbon is trained through these openings 21 and 22 and through corresponding openings 21a and 22a in the page section 17. A knot is tied in the ends of the thus trained and perhaps somewhere else knotted cord or ribbon 19 and the tail portions a, b are disposed across the lower portion of the page section 16 with a deposit of sealing wax 23 disposed thereover and impressed with a suitable seal 24, preferably of the national identification bureau that issues these identification devices. The photograph 20 is visible through the rectangular-shaped opening 25 in the page section 16.

Obviously, the page sections can be lined and printed for the collection of desired information and it is preferably that an area 26 be set aside for the fingerprint 27.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An identification device comprising a foldable book back having openings therein spaced along said fold, a leaf forming assembly in said back comprising a sheet folded centrally to provide leaf forming sections each folded centrally to provide a pair of leaves, the sections being provided with openings spaced along the folds thereof for registration with the openings of said back, a flexible tie member threaded through said openings to bind the sheets to said back, said member tying a pair of said leaves together in superposed relation, and one leaf of said pair being provided with a sight opening therein, an identification panel interposed between said pair of leaves for viewing through said sight opening, and having openings therethrough, said tie member being threaded through the openings in said panel, and a seal securing the ends of said tie member to one of said leaves.

SALVATORE ARICO.